UNITED STATES PATENT OFFICE.

CARL HOEPFNER, OF FRANKFORT-ON-THE-MAIN, GERMANY; HENRY ORTH, JR., ADMINISTRATOR OF SAID HOEPFNER, DECEASED.

PROCESS OF EXTRACTING ZINC OR OTHER METALS FROM THEIR ORES.

SPECIFICATION forming part of Letters Patent No. 704,641, dated July 15, 1902.

Application filed July 27, 1900. Serial No. 25,051. (No specimens.)

*To all whom it may concern:*

Be it known that I, CARL HOEPFNER, a subject of the Emperor of Germany, residing at Frankfort-on-the-Main, in the Empire of Germany, have invented certain new and useful Improvements in Processes of Extraction of Zinc or other Metals from Their Ores; and I do hereby declare the following to be a full, clear, and exact description of the invention, such as will enable others skilled in the art to which it appertains to make and use the same.

My invention relates to the production of soluble salts, especially chlorid of metals and sulfite of alkali metal or alkaline earths.

Oxid or hydroxid of metals, as copper, nickel, cadmium, and more particularly zinc, or sulfids of those metals oxidized by roasting, or their insoluble oxygen compounds, such as carbonate or silicate of zinc, or substances containing such—for instance, roasted mixed sulfid ores—are brought into contact with water and sulfurous gases sufficient to form monosulfite, such as $ZnSO_3$, (monosulfite of zinc,) and with a soluble salt of an alkali metal, such as chlorid or sulfate of sodium. Thereby a solution is formed containing sulfite of alkali metal—for instance, sulfite of sodium and chlorid or sulfate of zinc:

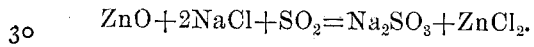
$$ZnO + 2NaCl + SO_2 = Na_2SO_3 + ZnCl_2.$$

To separate the sulfite of alkali metal in a solid form from the zinc solution it suffices to make or keep this solution concentrated in the original alkali-metal salt, such as common salt, preferably at a temperature above normal. Thus sulfite of alkali metal is precipitated by reason of its being almost insoluble in concentrated solutions of common salt, and a solution can be obtained containing about ten per cent. of zinc as a chlorid and but one per cent. to two per cent. of sulfurous acid, combined as sodium sulfite, ($Na_2SO_3$,) which latter can easily be removed by chlorid of lead or chlorid of calcium or by hydroxid of calcium, which in this case would act as a producer of chlorid of calcium.

$$PbCl_2 + Na_2SO_3 = 2NaCl + PbSO_3 \text{(insoluble)}$$
$$CaCl_2 + Na_2SO_3 = 2NaCl + CaSO_3 \text{(insoluble.)}$$

Out of this solution of chlorid of zinc oxid of zinc may be produced by addition of lime or metallic zinc by electrolysis. Thus by electrolysis fifty per cent. to ninety per cent. of the zinc in solution may be precipitated in a pure metallic state, whereupon the residual solution can be partially used to produce by addition of lime the chlorid of calcium required for precipitation of sulfurous acid, which is combined as sodium sulfite, and to reëmploy the solution for dissolving new quantities of oxid of zinc by reaction with $SO_2$ after the sodium sulfite has been partially or wholly removed from the solution.

The sulfite of sodium which in the described reaction remained undissolved in the solution of chlorid of zinc on account of the presence of a large quantity of sodium chlorid may be extracted from the ore residue by addition of water and utilized. Out of the ore residue thus wholly or partially freed from zinc, lead and silver may be recovered by the common smelting process.

When I desire to produce metallic zinc or zinc oxid in those places where sodium sulfite has no market value, I produce chlorid of calcium by the addition of lime or the solution containing zinc, as aforesaid, and convert the calcium chlorid into sulfite of calcium by the addition of sodium sulfite, thereby regenerating the solution in sodium chlorid:

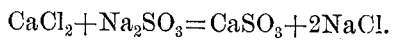
$$CaCl_2 + Na_2SO_3 = CaSO_3 + 2NaCl.$$

Any zinc chlorid being present will be converted into zinc oxid by means of the lime in accordance with the following reaction:

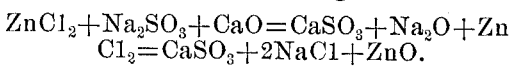
$$ZnCl_2 + Na_2SO_3 + CaO = CaSO_3 + Na_2O + ZnCl_2 = CaSO_3 + 2NaCl + ZnO.$$

Although I have made mention of sulfites of alkali metal in general, it is to be understood that either of these—viz., the mono or bisulfite—will be produced by suitably regulating the quantity of sulfurous-acid gas, and it is quite difficult to regulate this gas-supply in order to form monosulfite of alkali metal; but no regulation of the supply will be required to form bisulfite of alkali metal, as it will make no difference if I have an excess of sulfurous-acid gas.

The monosulfite of alkali is preferably formed at temperatures above normal, while the bisulfite is preferably formed at temperatures below normal.

Having thus described my invention, what

I claim as new therein, and desire to secure by Letters Patent, is—

1. The process, which consists in reacting on a material containing an oxygen compound of metals insoluble in water and whose chlorids are soluble in a solution of alkali-metal chlorid, with sulfurous acid and an aqueous solution of alkali-metal chlorid, whereby a solution is formed containing a chlorid of a metal, substantially as set forth.

2. The process, which consists in reacting on a material containing an insoluble oxygen compound of zinc, with water and sulfurous acid, sufficient to form monosulfite of zinc, and an aqueous solution of a chlorid of a metal of the alkalies, whereby a solution is formed containing chlorid of zinc and sulfite of the alkali metal, substantially as set forth.

3. The process, which consists in reacting on an ore or material containing an insoluble oxygen compound of zinc, with water, sulfurous acid and such proportion of a chlorid of a metal of the alkalies as will result in a concentrated solution of the latter, thereby producing a solution containing chlorid of zinc, and precipitating part of the sulfite of alkali thus formed, substantially as set forth.

4. The process, which consists in reacting on an ore or material containing an insoluble oxygen compound of zinc, with water, sulfurous acid and such proportion of a chlorid of a metal of the alkalies as will result in a concentrated solution of the latter, thereby producing a solution containing chlorid of zinc and simultanously precipitating part of the sulfite of alkali thus formed, and removing the sulfite remaining in the solution by a suitable precipitant, substantially as set forth.

5. The process, which consists in reacting on a material containing zinc, with sulfurous acid and an excess of chlorid of a metal of the alkalies at a temperature above normal, thereby producing a solution containing chlorid of zinc and precipitating nearly all of the sulfite of alkali thus formed, removing the remaining sulfite by a suitable precipitant and recovering the zinc, substantially as set forth.

6. The process, which consists in reacting on an ore of zinc with sulfurous acid and a solution of a chlorid of a metal of the alkalies, thereby producing chlorid of zinc and sulfite of alkali metal, concentrating the resulting solution, thus precipitating the greater part of the alkali-metal sulfite, and removing the remainder by a soluble salt of a metal capable of forming insoluble sulfites, recovering zinc and returning the resulting solution into the cycle of operations, substantially as set forth.

7. The process, which consists in reacting on an ore or material containing an oxygen compound of zinc, with sulfurous acid and a solution of an alkali-metal chlorid, thereby producing chlorid of zinc and alkali-metal sulfite, removing the alkali-metal sulfite, recovering zinc by precipitation with lime, and using the resulting solution thus obtained for double decomposition with sulfite of alkali metal previously obtained, thereby regenerating alkali-metal chlorid, and returning the latter into the cycle of operations, substantially as described.

8. The process, which consists in reacting on an ore or material containing an oxygen compound of zinc, copper, cadmium and nickel, with sulfurous-acid gas, water and an alkali-metal chlorid, thereby producing a solution containing metallic chlorids and alkali-metal sulfite, precipitating the latter as solid sulfite on the ore residue and removing and treating the solution to remove any remaining sulfite with a suitable precipitant, recovering the metals as oxides by means of lime, returning the resulting calcium-chlorid solution into the cycle of operations, and smelting the ore residue and sulfite for metal, substantially as set forth.

9. The process, which consists in reacting on oxygen compounds of those metals whose chlorids are soluble in solutions of alkali-metal chlorids, with soluble alkali-metal chlorid in the presence of water and sulfurous acid to form sulfites of the metals, thereby obtaining a solution containing chlorids of the metals and a precipitate of bisulfite of the alkali metal, sufficient sulfurous acid being used to form said bisulfite, substantially as set forth.

10. The process, which consists in reacting upon an oxygen compound of zinc with an alkali-metal chlorid in the presence of water and sulfurous acid to form sulfites of zinc, thereby obtaining a solution containing chlorid of zinc and precipitating bisulfite of a metal of the alkalies, sufficient sulfurous acid being used to form said bisulfite, substantially as set forth.

11. The process, which consists in reacting upon oxygen compound of zinc with alkali-metal chlorid in the presence of water and sulfurous acid to form sulfite of zinc, thereby obtaining a solution substantially concentrated in alkali-metal chlorid and containing zinc chlorid in solution and precipitating bisulfite of the metal of the alkalies, sufficient sulfurous acid being used to form said bisulfite, substantially as set forth.

12. The process, which consists in reacting on oxygen compounds of those metals whose chlorids are soluble in solutions of alkali-metal chlorids with sulfurous acid to form sulfites of the metals, adding a sufficient quantity of an aqueous solution of an alkali-metal chlorid, thereby forming a solution containing chlorids of metals and solid bisulfite of the alkali metal, substantially as set forth.

In testimony that I claim the foregoing as my invention I have signed my name in presence of two subscribing witnesses.

C. HOEPFNER.

Witnesses:
B. W. SOMMERS,
HENRY ORTH, Jr.